United States Patent Office 2,801,132
Patented July 30, 1957

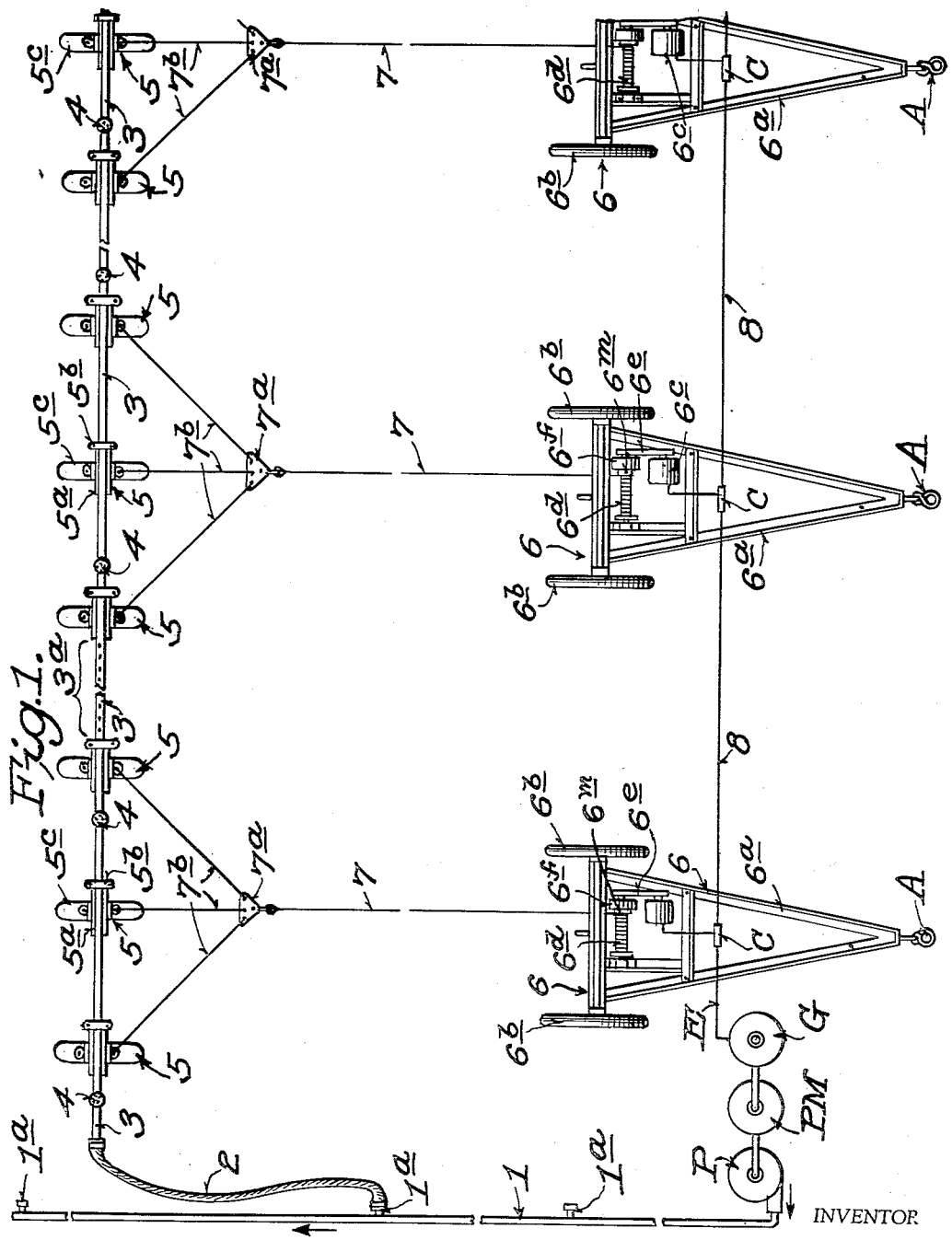

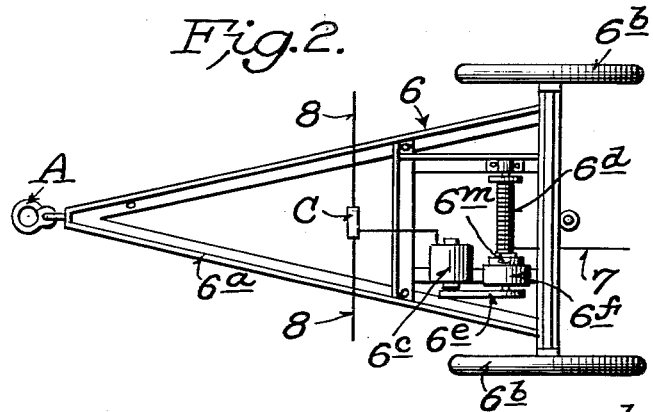
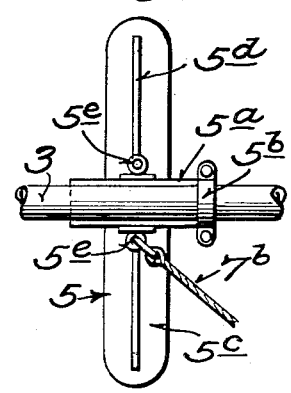
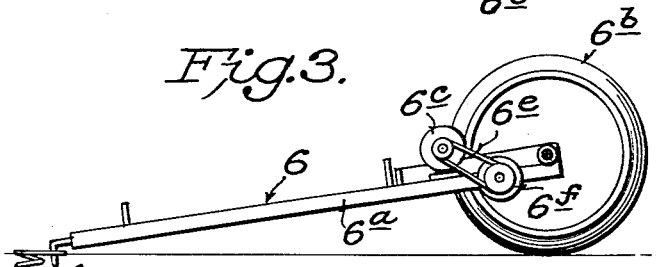
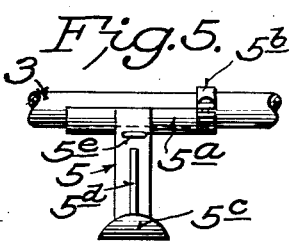
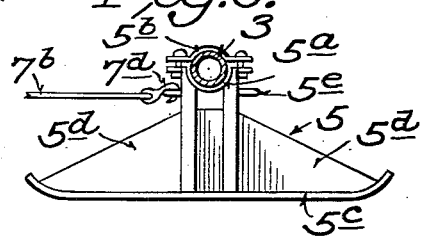
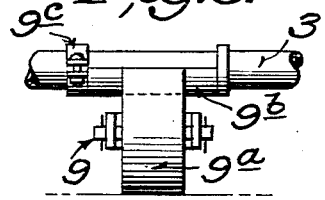
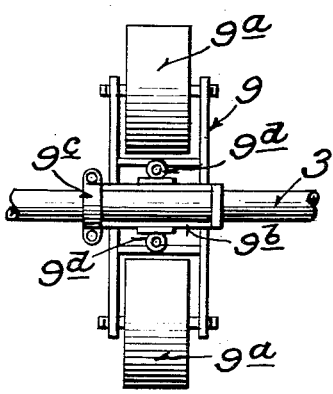
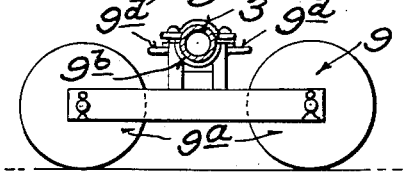
INVENTOR
LUTHER P. SHUCK,
BY
ATTORNEYS

2,801,132

CONTINUOUS MOVEMENT IRRIGATION SYSTEMS

Luther P. Shuck, Greensburg, Kans.

Application November 4, 1953, Serial No. 390,233

2 Claims. (Cl. 299—47)

My invention relates to irrigation systems and equipment, and more particularly relates to spraying means adapted to uniformly water a relatively large ground area.

The principal object of my invention is to provide watering apparatus including a long spraying pipe disposed transversely across the ground area to be sprayed and supported on a plurality of ground engaging runners, which spraying pipe is advanced longitudinally along the ground area at a uniform rate, the pipe being supplied with water under pressure from a supply pump coupled to the pipe by means of a flexible hose.

Another object of my invention is to provide a self-advancing spraying means including a composite spraying pipe which may be made up of a plurality of shorter spray pipe lengths all coupled together to form the composite spraying means. The composite spray pipe may either be perforated so as to provide a substantially uniform linear spray pattern or may be a continuous pipe having individual spray heads attached thereto and spaced along the length thereof.

Another very important object of my invention is to provide spray pipe towing means which will positively advance all of the sections of the spray pipe at a uniform rate so that the water distribution will be uniform along a straight line of advance of the spray pipe across the ground area. More particularly it is an object of this invention to provide a spray pipe advancing means including a plurality of winch units, each of which units is mounted on a wheeled frame and includes a motor connected to a cable winding drum through reduction gearing which is sufficient to impart a very slow rate of rotation to the cable drum. Each cable drum winds up a small-diameter aircraft-type cable, the outer end of which is connected to the spray pipe, this invention contemplating the use of a plurality of spaced winch units, the respective tow cables of which are connected to spaced points along the spray pipe.

Another important object of my invention is to provide in each winch unit a quick-release coupling between the motor and the associated cable drum whereby the motor may be readily disconnected therefrom so that each winch unit may be initially towed out to the end of the cable, at which location each respective winch unit will be anchored to the ground so that when the respective motors are put into operation on the winch units the respective cables will be wrapped on their associated cable drums at a uniform rate so that the spray pipe will thereby be towed over the ground area at a uniform rate, the spray pipe advancing frontally and in linear alignment.

My invention contemplates the use of electric motors on the respective winch units, which motors may be relatively small because of the large reduction ratio which I provide between the motor and the cable drum. The rate of advance of the spray pipe may be controlled by changes in the gear ratio of the drive between the motor and cable drum or else may be controlled by changing pulley ratios where a belt and pulley drive is used. Where electric motors are used on the respective winches, the motors may be either synchronous or non-synchronous motors, as desired; synchronous motors probably not being necessary where the reduction in the drive ratio is very great, i. e., where a 1700-R. P. M. motor is geared down to provide a pipe advance of approximately one foot per minute.

Where electric motors are used on the respective winch units my invention contemplates the connecting together of the respective winch units by electric drop-cords, the length of each such cord being the same as the spacing between cable connection points on the spray pipe so that when the respective winch units are towed away from the spray pipe out to the full length of the cables, the electric drop cords running from winch unit to winch unit may be used to properly space the winch units transversely with respect to each other.

Another important object of my invention is to provide a prime-mover unit which may include both a water pump for supplying water under pressure to the spray pipe and also an electric generator for supplying power to the motors on the respective winch units, the generator and the water pump being driven by a single prime mover engine.

Another object of my invention is to provide a water-pressure supply pipe disposed longitudinally of the ground area to be sprayed, the supply pipe having a plurality of hose connections spaced along its length to any one of which a flexible hose, attached at one end to the spray pipe, may be connected at its other end to thereby supply water under pressure to the moving spray pipe.

Other objects and advantages of the present invention will become apparent from the following discussion of the drawings wherein:

Figure 1 is a partial plan view showing the various elements of the apparatus operatively connected, but showing only three winch units, as distinguished from a greater number of winch units and a greater spray pipe length which would probably be used in a practical installation.

Fig. 2 is a plan view of a winch unit.

Fig. 3 is a side elevational view of a winch unit.

Fig. 4 is a plan view of one of the pipe-supporting skid members.

Fig. 5 is a front elevational view corresponding to Fig. 4.

Fig. 6 is a side elevational view corresponding to Fig. 4.

Fig. 7 is a plan view of a modified spray pipe supporting member showing such member provided with wheels instead of with a skid runner.

Fig. 8 is a front elevational view of the modification shown in Fig. 7.

Fig. 9 is a side elevational view of the modification shown in Fig. 7.

Referring to the drawings, in Fig. 1 is illustrated a water pressure pump P attached to a water supply pipe 1 disposed longitudinally on the ground area to be watered, the water supply pipe 1 being provided with a plurality of spaced hose connectors 1a, to any one of which may be connected a flexible coupling hose 2, which hose conducts water under pressure from the supply pipe 1 to a spray pipe 3. The spray pipe 3 may be made of iron or aluminum or other material, and is preferably made in sections coupled together to form a composite spray pipe so that during periods of disuse the pipe may be dismantled in easily-stored sections. The outer end of the spray pipe 3 is, of course, closed so that the water under pressure therein will be forced out of a plurality of spray heads 4 with sufficient pressure to distribute the water over the ground areas intermediate the respective spray heads 4. The spray pipe 3 is supported horizontally above the ground on a plurality of ground-engaging support members 5, each of which is provided with a pipe cradle 5a as shown in Figs. 4, 5 and 6, the spray pipe 3 being maintained in the pipe cradles 5a by means of a suitable strap 3b which may be secured to the cradle 5a by screw means. The type of spray pipe support 5 shown in Figs. 1, 4, 5 and 6 includes a ground-engaging skid runner 5c disposed transversely of the spray pipe cradle 5a, and may also be provided with stiffening webs 5d to strengthen the respective support. The eyelets 5e are provided for the purpose hereinafter explained.

Referring again to Fig. 1, a plurality of winch units 6 are provided for the purpose of towing the spray pipe longitudinally along the area to be sprayed. Each winch unit includes a substantially triangular frame 6a as shown in Figs. 2 and 3, one end of each frame being supported by a pair of spaced wheels 6b provided for the purpose of facilitating advancing the respective winch units forwardly after the spray pipe has been towed up to the previous location of the line of winch units. Each winch unit has mounted on its frame an electric motor 6c which motor is connected, in the particular embodiment shown in the figures, to a cable drum 6d through a belt and pulley arrangement 6e which drives one end of a reduction gear box 6f. Disposed between the reduction gear box 6f and the cable drum 6d is a quick-detachable coupling 6m for the purpose hereinafter stated. Extending outwardly from the cable drum 6d in the direction of the spray pipe 3 is a tow cable 7, which cable is wound upon or unwound from the drum 6d as hereinafter explained. The cable 7 may have at its outer end a connecting plate 7a, to the outer end of which is attached a plurality of individual tow cables 7b forming a harness connected at its outer end to a plurality of points along the spray pipe 3, so as to distribute the pull of the spray pipe 3 along its length, thereby avoiding bending thereof. Each tow line 7b is connected at eyelet 5e to a ground-engaging support member 5 secured to the spray pipe 3 in the manner illustrated in Fig. 1. It is to be understood, however, that the harness arrangements 7a—7b is employed merely to reduce the number of winch units required to advance the spray pipe 3 along the ground area to be sprayed. The particular number of tow cables 7b connected between the spray pipe 3 and the connecting plate 7a is not important.

I have also provided an electric generator G which may be located near the pump P, the pump P and the generator G being operated by the same prime mover PM which may be a gasoline engine or other suitable source of power. An electric cord E connects the generator to the nearest winch unit, and the other respective winch units are each connected together by a drop-cord 8 which carries electric power from one winch unit to the next. Each of the drop-cords 8 is the same length as the distance along the spray pipe 3 between the respective ground-engaging support members 5 so that when the respective ends of the drop-cords 8 are connected to the winch units at the electric connectors C and winch units are spaced by the lengths of the cords 8, the winch units will automatically be properly spaced so that the tow cables 7 will all be respectively parallel when coupled to the connecting plates 7a opposite each ground-engaging support member 5.

Figs. 7, 8 and 9 show a modified form of ground-engaging support 9, which type of support is provided with roller wheels 9a, with spray pipe supporting cradles 9b and with a C-shaped strap 9c to retain the spray pipe 3 in the cradles 9b. The roller type support 9 is understood to be interchangeable with the skid type support 5 on the spray pipe 3. Each roller type ground-engaging support is also provided with an eyelet 9d to which a tow cable 7b may be connected in the manner shown in Fig. 6 by a hook 7d.

Operation

In using the irrigation system which is the subject matter of my invention, the prime mover, generator and flexible units will be located at some point where there is a source of water, and the supply pipe 1 will be disposed longitudinally of the ground area to be sprayed, the supply pipe extending in one direction or in both direction from the pump P as may be required to extend the supply pipe the full length of the area to be sprayed. The individual sections of the spray pipe 3 will then be laid out transversely of the area to be sprayed at one end thereof, and the flexible hose 2 will be connected to one of the hose connectors 1a from the supply pipe so as to conduct water under pressure from the supply pipe 1 to the spray pipe 3. When the spray pipe 3 has been laid out on the ground and coupled together, the ground-engaging support members, either the skid-type support 5 or the roller-type support 9, will be connected to the spray pipe 3 by means of the collars 5d or 9c, as the case may be. The ground-engaging support members will be spaced along the spray pipe 3 with spacing intervals corresponding to the lengths of the electric drop cords 8 connecting the winch units together. Each winch unit is then connected by means of cables 7 and 7b to the spray pipe 3 in the manner shown in Fig. 1, and the quick-release mechanism 6m is actuated to disengage each gear box 6f from each cable drum 6d so that the winch units 6 may each be towed out to the end of the cable 7, which cable because of its small diameter may be 400 or 500 feet long, more or less, depending on the size of the field which the irrigation system is to spray. The quick-disengaging mechanisms 6m are then re-engaged and the electric drop-cords 8 and the electric supply cord E are connected between the respective winch units and the generator G so as to space the winch units transversely of the field at such intervals as will permit the cables 7 to stretch outwardly in mutually parallel relation in the direction of the spray pipes 3. The aft end of each winch unit may be anchored to the earth by ground anchors A, as shown in Figs. 1, 2 and 3.

With the various elements of the irrigation apparatus connected as aforementioned, the prime mover is then started to thereby supply water under pressure to the water system of the equipment and to supply electric power to the respective electric motors 6c, which motors turn the respective cable drums 6d through the gear boxes 6f, thereby winding the cables 7 on their respective cable drums 6d and causing an aligned frontal advance of the spray pipe 3, the water spraying outwardly onto the ground through the respective spray heads 4 or else through a plurality of perforations in the spray pipe as shown at 3a in Fig. 1. The water spraying outlets on the spraying pipe 3 may be directed rearwardly of the advance of the pipe 3 so that the support members 5 or 9 will run on dry ground.

Each winch unit motor 6c may also be provided with its own electric switch so that in the event that the rate of advance of the pipe is not linear because of hills on the ground being sprayed one or more of the motors may be turned off to permit retarded portions of the pipe to catch up with the more advanced portions thereof.

It is to be clearly understood that the particular embodiments shown in the drawings are illustrative only and are not intended to limit the scope of my invention, which scope is determined by the appended claims.

I claim:

1. A continuous-movement irrigation system for spraying water over a ground area from a source of water pressure, comprising a spray pipe disposed transversely of said ground area, said pipe having a plurality of outlets spaced along its length; a flexible hose connected between said source and said spray pipe; ground engaging support means spaced along said spray pipe and including a pipe receiving cradle, means for retaining said spray pipe in said cradle, and a skid runner fixed to the lower side of said cradle and disposed at right angles thereto; a plurality of motor-operated winch units, each unit being connected by a tow cable with a tow point on said spray pipe and each of said winch units being supported on a chassis having ground-engaging wheels; and anchor means for selectively fixing each chassis to the ground along a line parallel to and spaced longitudinally of the ground area from said spray pipe, whereby when said motors are operated the tow cables will all be wound on said winch units at a uniform rate to advance said spray pipe along the ground, said winch units being each connected with the adjacent winch units by electric cords, and the lengths of said cords being the same as the distances between tow points on said spray pipe.

2. A continuous-movement irrigation system for spraying water over a ground area from a source of water pressure, comprising a spray pipe disposed transversely of said ground area, said pipe having a plurality of outlets spaced along its length; a flexible hose connected between said source and said spray pipe; ground engaging support means spaced along said spray pipe and supporting the latter above the ground; a plurality of motor-operated winch nuts, each unit being connected by a tow cable to a connecting plate and each connecting plate being attached to a plurality of short connecting cables fanning out therefrom and being each connected to a separate ground-engaging support means on said spray pipe to distribute the towing pull along the length of the spray pipe, and each of said winch units being supported on a chassis having ground-engaging wheels; and anchor means for selectively fixing each chassis to the ground along a line parallel to and spaced longitudinally of the ground area from said spray pipe, whereby when said motors are operated the tow cables will all be wound on said winch units at a uniform rate to advance said spray pipe along the ground, said winch units being each connected with the adjacent winch units by electric cords, and the lengths of said cords being the same as the distances between adjacent tow plates.

References Cited in the file of this patent

UNITED STATES PATENTS

| | | |
|---|---|---|
| 664,240 | Doehring | Dec. 18, 1900 |
| 757,338 | Nolting | Apr. 12, 1904 |
| 887,911 | Bevill | May 19, 1908 |
| 2,676,471 | Pierce | Apr. 27, 1954 |

FOREIGN PATENTS

| | | |
|---|---|---|
| 271,716 | Germany | Mar. 18, 1914 |
| 635,424 | Great Britain | Apr. 12, 1950 |